United States Patent [19]
Kim et al.

[11] 3,929,965
[45] Dec. 30, 1975

[54] DUAL PURPOSE AUTO EXHAUST CATALYSTS

[75] Inventors: Gwan Kim, Columbia; Michael Vance Ernest, Baltimore, both of Md.

[73] Assignee: W. R. Grace & Co., New York, N.Y.

[22] Filed: May 16, 1974

[21] Appl. No.: 470,596

[52] U.S. Cl. .................... 423/213.5; 252/466 B
[51] Int. Cl.² ........................................ B01D 53/00
[58] Field of Search............. 423/213.2, 213.5, 239; 60/301; 252/466 B

[56] References Cited
UNITED STATES PATENTS

| | | | |
|---|---|---|---|
| 2,330,664 | 9/1943 | Bennet et al. | 423/213.5 |
| 3,118,727 | 1/1964 | Cohn | 423/239 |
| 3,257,163 | 6/1966 | Stiles | 423/213.5 |
| 3,370,914 | 2/1968 | Gross et al. | 423/213.5 |
| 3,397,034 | 8/1968 | Tulleners et al. | 423/213.5 |
| 3,741,725 | 1/1973 | Graham | 423/213.5 |
| 3,776,859 | 12/1973 | Simpson | 423/213.2 X |
| 3,787,560 | 1/1974 | Stephens | 423/213.2 |
| 3,790,350 | 2/1974 | Haensel | 60/301 X |
| 3,816,594 | 6/1974 | Kobylinski et al. | 423/213.7 |

FOREIGN PATENTS OR APPLICATIONS

| | | | |
|---|---|---|---|
| 662,460 | 12/1951 | United Kingdom | 423/213.5 |

*Primary Examiner*—G. O. Peters
*Attorney, Agent, or Firm*—Joseph P. Nigon

[57] ABSTRACT

A process is described for the manufacture of a catalyst for converting the carbon monoxide, hydrocarbons, and nitrogen oxides which appear in the exhaust from automobiles to harmless carbon dioxide, water, and nitrogen. The catalyst consists of a simple mixture of two catalytic compositions. The major component of the mixture is capable of reducing nitrogen oxides and the minor component of oxidizing hydrocarbons and carbon monoxide. The use of this mixture shows unexpected synergistic activity for the removal of carbon monoxide and hydrocarbons without sacrificing the activity for nitrogen oxide removal.

2 Claims, No Drawings

DUAL PURPOSE AUTO EXHAUST CATALYSTS

BACKGROUND OF THE INVENTION

"Smog" as a term that is generally employed is broadly understood to refer to a variety of phenomena which are related to the interaction of nitrogen oxides, hydrocarbons, and sunlight. These phenomena include a foglike haze in the atmosphere, eye irritation, plant damage, and the like.

The formation of excessive and objectionable levels of hydrocarbons in the atmosphere has been attributed to the incomplete oxidation of petroleum products such as gasoline in internal combustion engines. The interaction between the oxides of nitrogen and the unburned hydrocarbons to form smog requires sunlight. It has been found, for example, that when plants are fumigated in the dark with various olefins and oxides of nitrogen at a concentration of about 1 p.p.m., no damage is observed. However, when the same experiment is conducted in sunlight, typical damage patterns result, identical with those observed during a smog attack. In addition to plant damage, the formation of phototoxicants results in eye irritation as well.

Exhaust gases from internal combustion engines have been demonstrated to be a primary cause of photochemical smog in heavily populated urban areas. The olefin and nitrogen oxide components of such gases have been demonstrated to be the principal causes of photochemical smog.

In attempting to prepare a catalyst composition which will remove all three types of harmful auto exhaust components the prior art has run into several problems.

Alumina or modified alumina is known to be one of the best supports for auto exhaust catalysts for CO-hydrocarbon oxidation, regardless of the nature of catalytic ingredients, noble or non-noble metals, or a combination of these two. On the other hand, however, alumina or high alumina-containing materials are not preferred supports for the reduction of $NO_x$ to $N_2$, since its presence tends to limit the conversion of $NO_x$ to $N_2$, and also alumina tends to form spinels with base metal ingredients under oxidizing conditions at high temperatures. Consequently, most of superior oxidation catalysts do not have sufficient activity or stability for the reduction of $NO_x$ to $N_2$, or vice versa.

BRIEF DESCRIPTION OF THE INVENTION

We have found that the conversion of carbon monoxide, hydrocarbons, and nitrogen oxides in an automobile exhaust gas to innocuous entities can be greatly improved by contacting these gases with a mixture of two catalyst compositions, a major portion of an active reducing catalyst and a minor portion of an oxidizing catalyst composited together on a suitable support.

DETAILED DESCRIPTION OF THE INVENTION

The first step in the novel process of the present invention is the preparation of a stable active reduction catalyst.

Nitrogen oxide reduction catalysts are well known in auto emission control. They generally consist of a mixture of rare earth metals or their oxides distended on a suitable active acidic support material. Any generally accepted reduction catalyst of this type would serve the purposes of this invention; however, by way of example and not limitation we will describe our process using a noble metal-base metal oxide impregnated acidic support-type catalyst.

Suitable acidic supports are materials such as zirconia, silica, silica-alumina, zircon, mullite and kaolin.

In this case steam stabilized silica-alumina is contacted by spraying, dipping, etc., with a soluble, decomposable nickel salt, such as nickelous nitrate. The impregnation is normally carried out using a solution of the impregnate containing about 10 to 50 wt. percent of the nickel salt. The impregnation is carried out to incipient wetness and this material is dried for a period of 2 to 20 hours at 200° to 300°F.

The conversion of the nickelous nitrate to the oxide is conveniently carried out by air calcining the impregnated silica-alumina at 800° to 1800°F for a period of from 1 to 4 hours.

This material is subsequently re-impregnated by similar techniques as those described above, with a solution of decomposable noble metal salts. Examples of suitable salts include the nitrates, nitrites, the chlorides, tetraamine nitrates, and oxychlorides of noble metals. More specifically, the noble metals to be used can be platinum, palladium, rhodium, ruthenium, or irridium, either alone or in combination. After drying the doubly impregnated silica-alumina, conversion to metal oxides can be readily carried out by simple air calcining at 800°F to 1800°F for a period of about 1 to 4 hours.

Alternate methods of preparation encompass a dissolution of both the noble metal salt and the nickel salt in the same solution and applying the mixed solution to the silica-alumina in any convenient manner, such as dipping, spraying, etc., and finally subjecting the system to thermal activation.

The preferred reduction catalyst of this invention is one in which the noble metal is palladium, platinum or a combination of the two; and more specifically, palladium or platinum promoted with rhodium, and with nickel oxide; all catalytically active materials being distended on a support.

The concentration of the noble metal component in the preferred catalyst composition is from 0.1 to 5 weight percent and the concentration of the nickel oxide component is about 5 to 80 percent by weight. A particularly preferred catalyst of this type contains approximately 1 wt. percent palladium, 0.04 wt. percent rhodium, and 50 wt. percent nickel oxide.

The second major step in the process of the present invention is the preparation of an active stable oxidation catalyst. This catalyst is once again composed of various noble metals distended upon a stable active support.

These active supports consist of oxides of certain selected metals such as cerium, chromium and titanium - alone or in combination - distended on any of the common catalyst carriers having sufficient strength, surface area and porosity. Examples of suitable oxidation catalyst carriers include such materials as mullite, spinel, silica, or alumina. Less preferred, but still effective supports can be made by distending the other rare earth oxides such as lanthanum, praseodymium, samarium, etc., on any of the above mentioned common catalyst carriers. These active supports are unique in their ability to induce maximum dispersibility of the noble metals which results in optimum activity. In addition, the specific supports have also been found to maintain the highly dispersed nature of the noble metals in extreme thermal environments.

For purposes of simplicity, we will describe the oxidation catalyst using ceria-alumina as the support, although it is obvious that one of the previously noted carriers may be substituted for ceria-alumina.

In the preparation of the ceria-alumina support, commercially available alumina granules are impregnated with an aqueous solution of cerous nitrate, dried and air calcined 4 hours at approximately 1875°F.

The activated and stabilized support is then clad or impregnated with solutions of the salts of a desired noble metal, such as, palladium, and/or platinum, and cerium again. Any of the soluble salts of these metals can be used in this step of our process. Examples of suitable salts include the nitrates, nitrites, the chlorides, the tetrammine nitrates of the noble metals and the oxychloride of ruthenium. The term "clad" means the technique of spraying atomized liquid over the hot surface of the support material. The use of such a method prepares a catalyst wherein the catalytically active ingredients are concentrated within a thin shell near the surface of the support.

Finally, the catalyst is dried, and activated by heating to temperatures of 1000° to 1800°F for periods of 2–24 hours. A particularly satisfactory catalyst is obtained by calcination of the impregnated support at a temperature of 1000° to 1200°F for periods of about 4–6 hours.

The noble metals can be present to the extent of 0.01 to 5 percent by weight based on the total weight of the catalyst. Cerium is present in the form of its oxide and comprises from 1 to 30 percent by wt. of the total catalyst. A particularly preferred oxidation catalyst compostion contains 1.4 % by wt. platinum, 0.6 % by wt. palladium, 20 % by ceria, and 78 % by wt. alumina.

At this point we have separately prepared an oxidation catalyst and a reduction catalyst. The next step in the process of the present invention involves forming a physical mixture of these two catalysts and either shaping the mixture into pellets, pills, balls, extrudates, etc., or distending the mixture on to a third support, specifically, a monolith Using any suitable grinding means, for example wet ball milling, the oxidation and reduction catalysts are separately reduced to a particle size of about 5 to 10 microns. The separate powders are then homogenized with water to form ceramic "slips".

Using conventional techniques well known in the art these ceramic slips are comingled in the proper proportions and formed into balls, pills, pellets, extrudates etc. or coated onto nodular supports.

In this form the final dual purpose catalyst has been found to be most effective when it contains from 50 to 90 % by wt. reduction catalyst promoted with from 10 to 50 percent by wt. oxidation catalyst.

The preferred embodiment of the present invention contemplates applying a combined slip of reduction and oxidation catalyst to a ceramic monolith, drying, and "setting" the resulting product.

One of the principal advantages of distending the catalytically active agents on a monolithic structure rather than on nodules of an inert support is that the amount of surface area per cubic inch of engine piston displacement is substantially lower with the monolithic type supports. The amount of catalyst should be sufficient to provide about 5–200 square inches of superficial surface area per cubic inch of engine displacement with 10–80 square inches of surface area per cubic inch of engine displacement being preferred.

When the catalyst is distended on a pelleted support the amount of surface area is substantially higher, starting at about 150–250 square inches of catalyst surface per cubic inch of engine displacement, in most cases, above 165 square inches of surface area per cubic inch of engine displacement. The preparation of these monolithic supports is not a part of this invention. Monolithic supports having the desired physical characteristics are commercially available. One method of preparing a suitable monolithic support consists of mixing a polyolefin, a filler, and a plasticizer in a suitable mixer. The mixture is then pressed into a sheet using conventional pressing techniques. The sheet is impressed with a series of ridges and rolled upon itself. The structure is then heated to fuse the polyolefin at the points of contact. After the fusions step, the plasticizer is extracted and the structure heated to above the degradation temperature of the polyolefin. When the polyolefin is completely burnt off, the structure is sintered to high temperatures to prepare the product monolith.

Although the monoliths are preferably prepared from alumina, monoliths of the other materials, such as cordierite, also give satisfactory results.

U.S. Pat. No. 3,331,787, to Keith, issued July 18, 1967, describes a process for preparing a coating monolithic support in some detail.

It is the principle object of this invention to provide a dual purpose catalyst for the reduction of nitrogen oxides and the oxidation of hydrocarbons and carbon monoxides. It is in the nature of good reduction catalysts to be unstable and rather inactive under oxidizing conditions. Therefore, we have found that in order to improve the activity and stability of a reduction catalyst for oxidation it is necessary to add a small amount of oxidation catalyst. The activity and stability of oxidation for such dual purpose catalysts can be readily adjusted simply by varying the ratio of mixing. It therefore should be noted that this ratio of mixing forms one of the central points of the present invention.

Oxidation and reduction catalyst ceramic slips, each containing from 10 to 50 % solids by weight, are mixed together to form a coating slip of 10 to 50 % by weight solids in the optimum ratio of from about 5 to 50% by weight oxidation catalyst to about 50 to 95% by weight reduction catalyst, or even more preferably, 10 to 30 % by weight oxidation catalyst to 70 to 90 % by weight reduction catalyst. The coating slip is applied to the ceramic monolith in any convenient manner known to the art and further dried at 200° to 300°F for 2 to 20 hours. The final step in the process is called setting, which simply means heating the monolith to from 700 to 1300°F for 1 to 5 hours.

The catalytic performance of the system was evaluated using the following method which simulates an exhaust gas environment in a bench scale apparatus.

The bench test is designed to simulate the exhaust gas composition and heat up conditions experienced by a catalyst during the initial part of the actual chassis dynamometer run. The test approximates the environment the catalyst will experience during the all-important "cold start" segment of the chassis test which accounts for a substantial portion of the total carbon monoxide emitted.

Monoliths for bench evaluation are of a size one ince in diameter by one inch long. Granular catalysts are approximately 3 × 4 mm in size and fill 13 cc of reactor volumne. These catalysts were tested in one inch I.D.

stainless steel and/or Vycor glass reactors for both the reduction of nitrogen oxides to nitrogen at a total gas rate regulated to achieve at gas hourly space velocity of 100,000 under net reducing conditions, and the oxidation of hydrocarbons and carbon monoxide at approximately 38,000 gas hourly space velocity. The simulated exhaust gas contains parts per million carbon as propane or hexane, volume percent oxygen, volume percent water vapor, volume percent NO, volume percent carbon moxide with the balance made up by nitrogen. The gas mixture is preheated so that the inlet gas temperature to the bed of catalyst is 600°F. As the hot gas passes through the room temperature catalyst, the bed begins to heat up in a manner similar to heat up in an actual catalytic device on an automobile. When the temperature in the bed becomes high enough, catalytic oxidation of the carbon monoxide, and hydrocarbon, and reduction of $NO_x$ in the stream commences and the temperature increases at an accelerated rate due to the heat of reaction. Catalyst performance is measured by determining the time and/or temperature required for given conversions of carbon monoxide, hydrocarbon, and $NO_x$. The more active catalysts will convert similar quantities of reactants in shorter periods of time or at lower tmeperatures.

Carbon monoxide and carbon dioxide are determined by nondispersive infrared analysis. Nitrogen oxides are analyzed by nondispersive infrared analysis and also indirectly by determining ammonia using a specific —ion electrode.

Our invention is further illustrated by the following specific, but nonlimiting examples:

In the following examples the terms "solid red" and "slip red" refer to physical forms of the reduction catalyst. Likewise, the terms "solid ox" and "slip ox" refer to physical forms of the oxidation catalyst.

EXAMPLE 1

Steam-stabilized silica-alumina (75% silica/25% alumina, surface area =79m²/gram, cracking catalyst (referred to as SSA) was impregnated with an aqueous solution of nickelous nitrate, dried, air calcined 2 hours at 1200°F to obtain a material consisting of 26.6% nickel oxide and 73.4% SSA. This material was re-impregnated with an aqueous solution of palladium tetrammine dinitrate and rhodium trichloride. After drying and 2 hour air calcination at 1200°F, a material, (solid red) with the following composition (dry basis) was obtained: 1.15% palladium, 0.05% rhodium, 26.3% nickeloxide, 18.1% alumina, 54.4% silica.

A slip (slip red) containing 26.5 weight percent of Solid red was prepared by wet ball milling and homogenization.

On the other hand, another material (Solid ox) consisting of 1.49% platinum, 1.49% palladium, 17.60% ceria, 79.42% alumina was prepared as follows: alumina granules were impregnated with and aqueous solution of cerous nitrate, dried and air calcined 4 hours at 1875°F to obtain a material consisting of 12.51% ceria and 87.49% alumina. It was re-impregnated with an aqueous solution containing palladium nitrate, platinum tetrammine dinitrate, and cerous nitrate. After vacuum drying at 175°F, the material was air calcined 3 hours at 1200°F. The resulting material was ground to pass a 230-mesh sieve.

Coating slips were prepared by blending Slip Red. with desired amounts of solid ox. one inch alumina monolith were coated with these slips to about 10% by weight, dried and set 1 hour at 1000°F. These catalysts were tested in 1 inch I.D. stainless steel and/or Vycor glass reactors for both the reduction of nitrogen oxides to nitrogen at approximately 100,000 GHSV under net reducing conditions, and the oxidation of carbon monoxide and hydrocarbon at approximately 38,000 GHSV.

The bench tests for oxidation were carried out according to the procedure for Dynamic Heat-up Test by feeding preheated gaseous mixture over the cool (or room temperature) catalyst bed. The feed compositions were as follows:

For the nitrogen oxide (NO) reduction test: 2% CO, 250 ppm $C_3H_6$, 1000 ppm NO, 0.2 1% $O_2$, 10% $CO_2$, 10% $H_2O$, balance $N_2$.

For the carbon monoxide (CO) hydrocarbon oxidation test: 6.5% CO, 283 ppm $C_6H_{14}$(n-hexane), 4.5% $O_2$, 10% $H_2O$, balance $N_2$.

Table I shows the CO oxidation activities of these catalysts relative to a conventional-oxidation reference catalyst activity index defined by the ratio of the area under the curve representing the mole % CO conversion on the sample catalyst as a function of time (seconds) to that corresponding to the reference catalyst. The results obtained for the reduction of NO to $N_2$ are presented in Tables II and III.

It is clear from these results that the presence of a small amount of good oxidation catalyst improves activity and stability for the oxidation, while retaining the major portion of activity for the reduction of NO to $N_2$.

TABLE I

| Catalyst | Wt. Ratio OX/red | Activity Before | Index for CO Oxidation (3 hrs. at 1800°F) (Air Calcination) After | Remarks |
|---|---|---|---|---|
| A | 0/100 | 2.3 | | Failed to take off |
| B | 10/90 | 1.30 | 2.52 | Better Oxidation Activity and Stability |
| C | 20/80 | 0.95 | 1.84 | |
| D | 100/0 | 0.61 | 1.72 | |

Oxidation Activity of Dual Purpose Catalysts

TABLE II

Reduction Activity of Catalyst A at 100,000 GHSV

| Ave. Bed Temp. (°F) | [CO/$O_2$] | Mole % Conv. of NO Gross | Net | Remarks |
|---|---|---|---|---|
| 964 | 10 | 96 | 67 | |
| 1095 | 2 | 94 | 93 | |
| 1043 | 10 | 96 | 80 | |
| 1113 | 10 | 97 | 83 | |
| 1297 | 2 | 94 | 93 | |

TABLE II-continued

Reduction Activity of Catalyst A at 100,000 GHSV

| Ave. Bed Temp. (°F) | [CO/O$_2$] | Mole % Conv. of NO Gross | Net | Remarks |
|---|---|---|---|---|
| 1315 | 10 | 98 | 93 | |
| 971 | 10 | 97 | 84 | |

\* Cooled under [CO/O$_2$] = 10

TABLE III

Reduction Activity of Catalyst B at 100,000 GHSV

| Ave. Bed Temp. (°F) | [CO/O$_2$] | Mole % Conv. of NO Gross | Net | Remarks |
|---|---|---|---|---|
| 942 | 2 | 94 | 94 | |
| 940 | 10 | 99 | 35 | |
| 1088 | 2 | 96 | 95 | |
| 1092 | 10 | 99 | 63 | |
| 1292 | 2 | 95 | 95 | |
| 1290 | 10 | 99 | 94 | |
| 950 | 10 | 99 | 63 | \* |
| 1100 | 10 | 99 | 80 | \* |

\* Bed temperature was changed under [CO/O$_2$] = 10

EXAMPLE 2

Commercially available silica gel was double impregnated with an aqueous solution of nickelous nitrate, with 300°F drying after each impregnation. After a 2 hour air calcination at 1100°F, the material was re-impregnated with an aqueous solution containing palladium tetrammine dinitrate and rhodium trichloride at a weight ratio of Pd/Rh = 23/1. It was then dried at 230°F, and air calcined 2 hours at 1100°F. The resulting material (Solid Red) had the following composition: 0.958% Pd, 0.042% Rh, 49.6% NiO, 49.4% SiO$_2$.

A slip (Slip red) containing 26.5 weight percent of Solid was prepared by wet ball milling for 20 hours.

Alumina powder (activated 2 hours at 1000°F) was impregnated with an aqueous solution of cerous nitrate, dried, and air calcined 2 hours at 1200°F to obtain a material consisting of 20% CeO$_2$ and 80% Al$_2$O$_3$. It was then re-impregnated with an aqueous solution containing tetrammine dinitrates of platinum and palladium and cerous nitrate, dried and set 2 hours at 1000°F. The composition of the resulting material (Solid Ox) was as follows: 0.526% Pd, 1.314% Pt, 23.31% CeO$_2$, balance Al$_2$O$_3$. A slip (Slip Ox) containing 26.5% Solid ox was prepared in the same manner as Slip red.

Catalysts were prepared by coating Poramic monoliths with slips consisting of 10% Solid Ox/90% Solid Red. or 20% Solid Ox/80% Solid red, followed by drying and 2 hour setting at 1000°F.

Evaluation of these catalysts for the reduction of NO to N$_2$ was conducted in a 1-inch I.D. Vycor reactor under net reducing conditions at about 100,000 GHSV, using the following feed: 3% CO, 1.5% H$_2$, 250 ppm C$_3$H$_8$, 1000 ppm No, 0.2–1% O$_2$, 10% CO$_2$, 10% H$_2$O, balance N$_2$. The results are presented in Table IV.

TABLE IV

Reduction Activity at 1000,000 GHSV
Under [CO + H$_2$]/[O$_2$]= 22.5

| Catalyst | Wt. Ratio 2D/2A | Mole % Conversion of NO to N$_2$ As a Function of Bed Temp. (°F) | | |
|---|---|---|---|---|
| | | 900 | 1000 | 1100 |
| E | 0/100 | 47.4 | 77.7 | 91.3 |
| F | 10/90 | 54.2 | 79.6 | 93.6 |
| G | 20/80 | 49.7 | 79.9 | 92.9 |
| H | 100/0 | 11.5 | 12.0 | 12.2 |

These catalysts were also evaluated according to the procedure for Dynamic Heat-up Test for the oxidation of CO and hydrocarbon at approximately 38,000 GHSV, using the following feed: 6.5% CO, 567 ppm C$_3$H$_8$, 4.5% O$_2$, 10% H$_2$O, balance N$_2$. Table V summarizes the results of these tests.

This example clearly demostrates the following: (1) Both activity and stability for CO and hydrocarbon oxidation can be significantly improved by mixing a good NO$_x$ reduction catalyst with a small amount of highly active and stable oxidation catalysts. (2) The ratio of mixing these two catalysts can be varied depending on the need for an increased oxidation or reduction activity. (3) The superior oxidation catalyst based on noble metals and ceria alumina (Catalyst H) has only a remote chance of succeeding as a dual purpose catalyst.

TABLE V

Oxidation Activity of Dual Purpose Catalysts

| Catalyst | Wt. Ratio OX/red | Activity Index for CO Oxidation | Remarks |
|---|---|---|---|
| E | 0/100 | 2.35 | |
| F | 10/90 | 1.73 | Better Oxidation Activity |
| G | 20/80 | 1.51 | |
| H | 100/0 | 0.61 | |

What is claimed is:

1. A method of converting the noxious components of exhaust gases to innocuous entities which comprises contacting said gases, having carbon monoxide to oxygen ratios of 2 to 10 with a catalyst consisting essentially of a mixture of two catalysts in which 70 to 90 percent of the mixture is a reducing catalyst consisting essentially of from 0.01 to 5 weight percent palladium and from 0.004 to 2 weight percent rhodium and from 5 to 80 percent by weight nickel oxide; and in which 10 to 30 weight percent of the mixture is an oxidation catalyst consisting essentially of 0.01 to 5 weight percent platinum and from 0.01 to 5 weight percent palladium, wherein said catalysts are distended on alumina supports containing 1 to 30 weight percent ceria.

2. A process according to claim 1, wherein, the catalyst composition is distended upon a pellet-type support.

\* \* \* \* \*